Feb. 10, 1925.
1,526,011
J. J. REINHOLD
AUTO BRAKE
Filed May 20, 1922
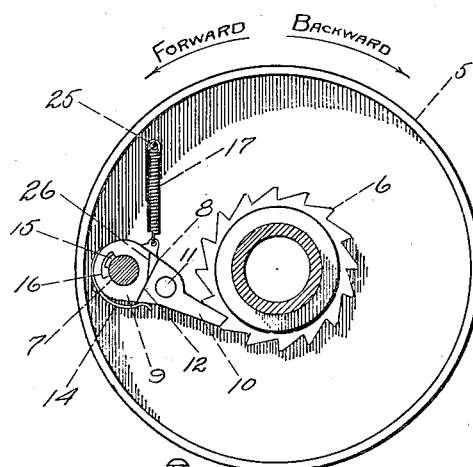
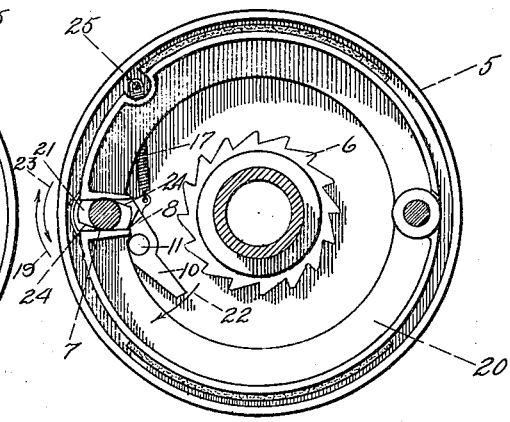
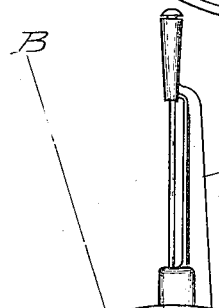
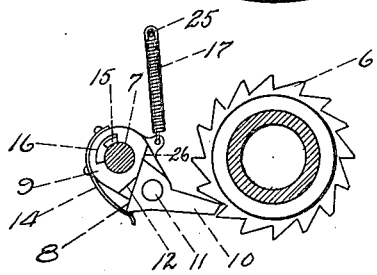
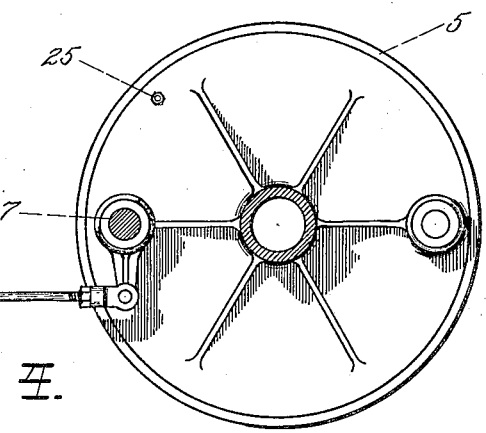
INVENTOR
JOHN J. REINHOLD
BY
ATTORNEY Patented Feb. 10, 1925.

1,526,011

UNITED STATES PATENT OFFICE.

JOHN J. REINHOLD, OF MARIETTA, PENNSYLVANIA.

AUTO BRAKE.

Application filed May 20, 1922. Serial No. 562,508.

*To all whom it may concern:*

Be it known that I, JOHN J. REINHOLD, a citizen of the United States, residing at Marietta, in the county of Lancaster and State of Pennsylvania, have invented new and useful Improvements in Auto Brakes, of which the following is a specification.

This invention relates to brakes for automobiles, and has for its objects to provide a brake which prevents the automobile from drifting backwards, but permits forward movement of the car at all times.

The object of this invention is to provide a positive locking brake mechanism of the above stated character, which is easy to release when under load, and to provide means whereby this positive locking brake mechanism may be manipulated through the emergency brake lever, particularly providing means through which this positive locking brake may be rendered effective without applying the emergency brake.

Other objects will be apparent from the following description, taken in connection with the accompanying drawing, forming a part hereof, and in which similar numerals refer to similar parts throughout the several views.

Fig. 1, represents one practical embodiment of my invention, incorporated in the brake drum construction.

Fig. 2, is practically a duplicate of Fig. 1 with the addition of the emergency brake expansion ring.

Fig. 3, discloses the releasing action of my brake.

Fig. 4, represents the emergency brake lever in conjunction with the brake drum, a portion of the brake rod being omitted.

In the drawing, 5 is a brake drum of the usual type which forms part of an automobile wheel and is provided with a ratchet wheel 6, forming a part thereof. 7 is the cam shaft of the emergency brake and carries the pawl 8. The pawl 8 is composed of two parts, the hub 9 and the pawl point 10. The pin 11 forms a hinge joint in the pawl 8, or in fact forms a toggle joint. The swinging movement of the pawl point 10 relative to the hub 9 is limited by the flat surfaces 26 and 12; this is very apparent by comparing the pawl shown in Fig. 1, with the one shown in Fig. 3. A spring 14 is provided to normally hold the pawl in a straight line as shown in Fig. 1. The pawl 8 is free to turn on the cam shaft 7 within the limits permitted by the key 15 and keyway 16. The spring 17, through the pin 25, normally tends to hold the pawl 8 in engagement with the ratchet wheel 6, or against the key 15 as conditions may determine; this is also apparent by comparing Figs. 1 and 3.

The emergency brake lever 18 has three positions; as shown it is in neutral position and neither the emergency brake or the ratchet brake are in operating condition. The various elements of the braking mechanism are then positioned as shown in Fig. 2.

The light broken line A, indicates the position of the brake lever when the emergency brake is set; and through movement of the brake lever from neutral position to this position, the cam shaft 7 turns in the direction indicated by the arrow 19, expanding the ring 20 through the cam 21 in the usual manner. During this operation the pawl 8 moves proportionally in the direction indicated by the arrow 22, but plays no part in locking the car.

The light broken line B indicates the position of the brake lever when the ratchet brake is set; through movement of the brake lever from neutral position to this position, the cam shaft 7 turns in the direction indicated by the arrow 23, and the spring 17 pulls the pawl 8 into engagement with the ratchet wheel 6. When the brake lever is in B position, the position of the elements is of this braking mechanism best represented in Fig. 1. The ring 20 is not expanded during this operation because clearance is provided on the cam 21 as shown at 24.

The object in constructing my brake to be effective only in one direction is to afford convenience in starting the car when on an up-grade; for instance, with the present day automobile construction it is necessary to engage the clutch with the engine at the same time the brakes are released, and it often occurs that the car drifts backwards to a considerable extent before the clutch is sufficiently engaged to start the car forward. The present day automobile engine is often stalled during this operation, when the brakes must again hastily be applied. It is my object to avoid this confusion and inconvenience.

The toggle joint formed by the pawl 8 is provided to afford easy releasing action of the pawl from the ratchet teeth when under load. By referring to Fig. 3 it is apparent how the pawl 8 becomes shorter during the releasing action, and releases itself in the direction the load is applied. After the pawl 8 is fully released the spring 14 will again straighten the pawl out to its normal condition.

Having thus described my invention, what I claim, and desire to secure by United States Letters Patent is as follows:

1. In a toggle acting pawl comprising a pawl hub pivotally mounted, a pawl pivotally fixed to said pawl hub, means for limiting the turning movement of said pawl in either direction relative to said pawl hub, and means for normally holding said pawl in one of said limited points of movement.

2. The combination of an element having ratchet teeth, a toggle acting pawl pivotally mounted to be engaged or disengaged with said teeth, said toggle action serving to effect an easy releasing of said pawl with said teeth, and means for engaging and disengaging said pawl with said teeth.

3. A vehicle brake, comprising a ratchet wheel adapted to rotate with the wheel of the vehicle, a toggle acting pawl pivotally mounted to arrest movement of said vehicle wheel, said toggle action serving to effect an easy releasing of said pawl to permit movement of said vehicle wheel, and means for engaging and disengaging said pawl with said ratchet wheel.

In testimony whereof I affix my signature.

JOHN J. REINHOLD.